Aug. 4, 1936.  E. X. SCHMIDT  2,050,020
METHOD OF AND APPARATUS FOR REMOTE PRESSURE
CONTROL IN FLUID DISTRIBUTION SYSTEMS
Filed May 1, 1933  2 Sheets-Sheet 2
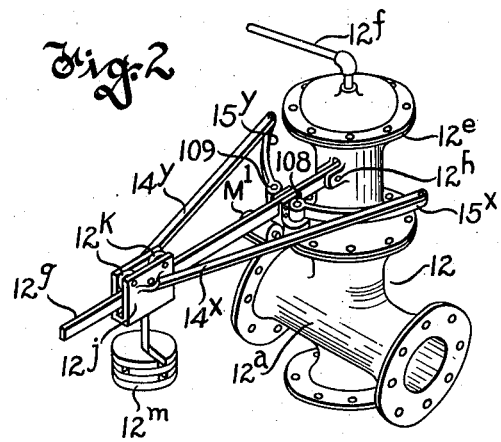
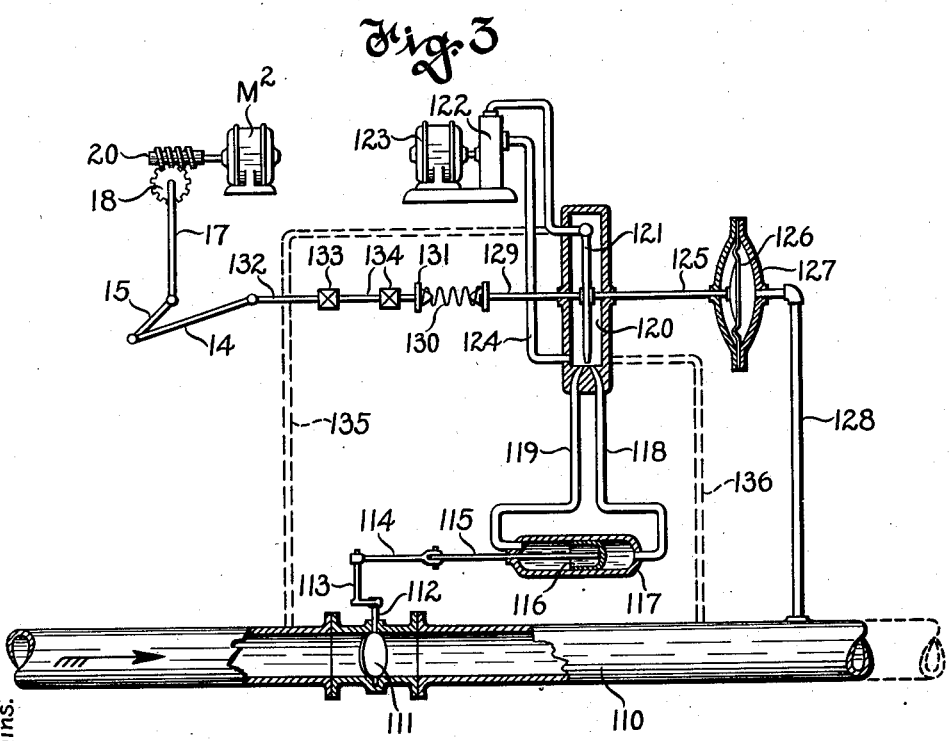
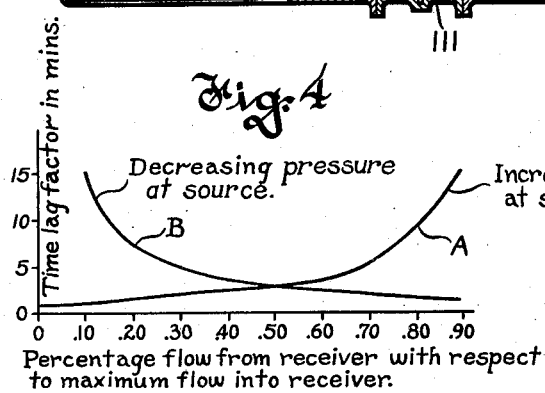
Fig. 4
Decreasing pressure at source.    Increasing pressure at source.
Percentage flow from receiver with respect to maximum flow into receiver.
Inventor
Edwin X. Schmidt
By Frank H. Hubbard
Attorney

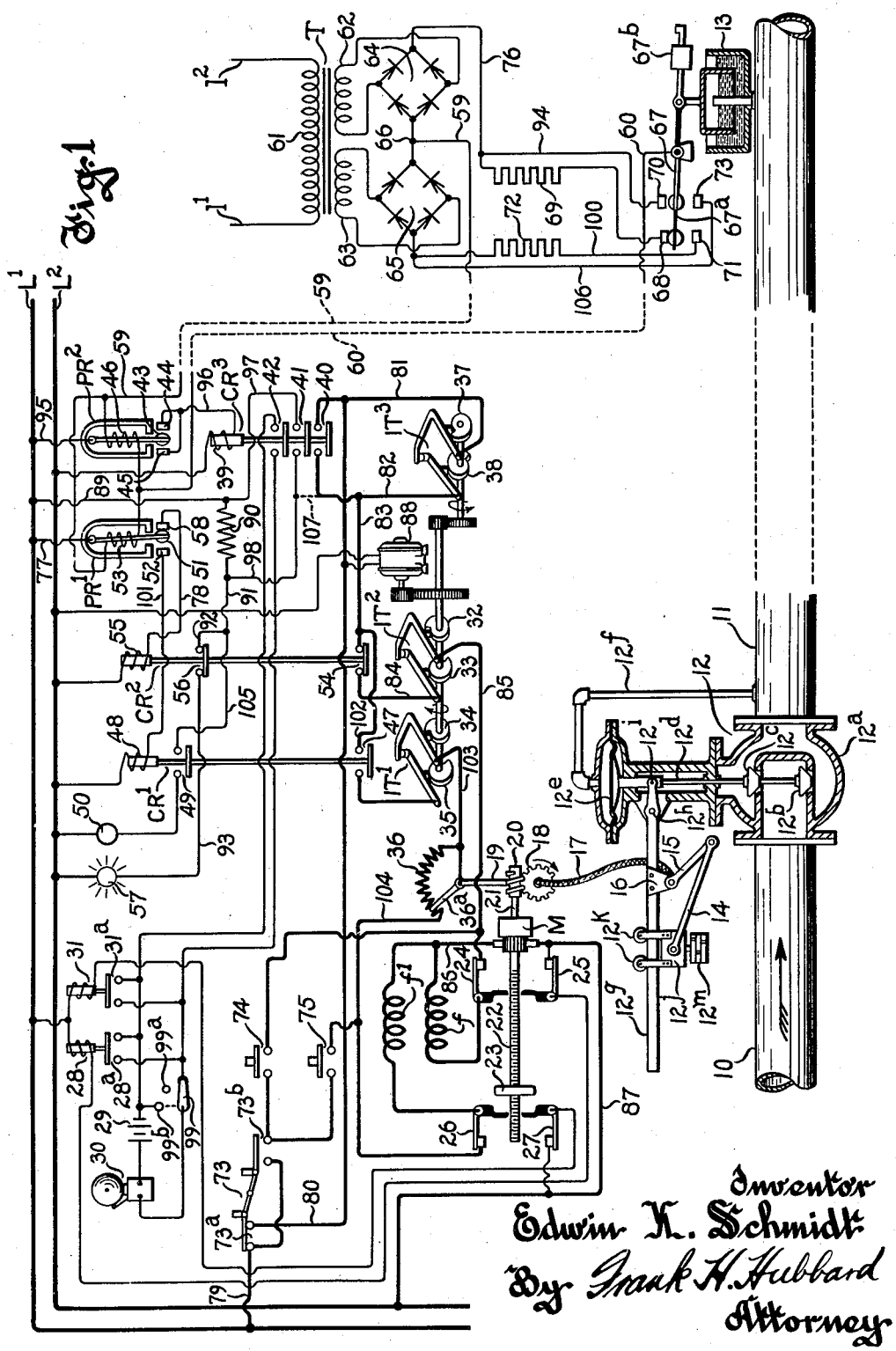

UNITED STATES PATENT OFFICE 2,050,020

METHOD OF AND APPARATUS FOR REMOTE PRESSURE CONTROL IN FLUID DISTRIBUTION SYSTEMS

Edwin X. Schmidt, Whitefish Bay, Wis., assignor to Cutler-Hammer, Inc., Milwaukee, Wis., a corporation of Delaware Application May 1, 1933, Serial No. 668,758

19 Claims. (Cl. 50—10)

This invention relates to improvements in methods of and aparatus for remote pressure control in fluid distribution systems.

An object of the invention is to provide an improved method of maintaining a substantially constant predetermined pressure at a remote point in a fluid distribution system.

Another object is to provide a novel method of compensating for pressure variations at the remote point as an incident to relatively wide and/or relatively rapid variations in demand for the fluid.

Another object is to provide a method of pressure control in fluid distribution systems wherein the time lag on increasing pressure at the source to compensate for decreasing pressure at the distant point and the time lag on decreasing pressure at the source to compensate for increasing pressure at the distant point are differentiated.

Another object is to provide apparatus for carrying out the methods aforementioned.

Another and more specific object is to provide a fluid distribution system having improved means for maintaining a substantially constant pressure at a remote point therein.

Another object is to provide a fluid distribution system having improved pressure control characteristics.

Another object is to improve the details of construction and operation of the pressure control parts of a fluid distribution system of the aforementioned character.

Other objects and advantages of the invention will hereinafter appear.

The accompanying drawings illustrate certain embodiments of my invention which will now be described, it being understood that the embodiments illustrated are susceptible of modification without departing from the scope of the appended claims.

Heretofore it has been recognized that on any remote pressure control system it is necessary to make adjustments of pressure at the source at a rate which takes into account the time lag between a given change of pressure at the source and the attainment of the effect of such change at the remote point. Such a system is described and claimed in the Pinkerton Patent No. 1,743,233, dated January 14, 1930.

So far as I am aware, however, no one has heretofore recognized the fact that in a given installation the time lag varies between very wide limits, due to a number of factors. Thus the time lag when the pressure is increased at the source to compensate for a decrease in pressure at the remote point has a characteristically different value as compared with the time lag when the pressure is decreased at the source to compensate for an increase in pressure at the remote point.

In fluid distribution systems of the character herein disclosed it is desired to maintain a substantially constant predetermined pressure at the remote point under conditions of variation of flow out of the system (demand) and independently of the flow distribution about the system. When no fluid is flowing into or out of the system the pressure at the source will obviously be of the same value as the pressure at the distant point. As gas flows out of the system it is necessary to hold a slightly higher pressure at the source. If all the gas were consumed at the remote point the excess pressure which would have to be maintained at the source would vary approximately as the square of the flow. As the distribution of the demand for the fluid is not under control this approximate relation between excess pressure and demand is subject to variation; but, in general, the relation persists to such an extent that the amount of excess pressure which must be maintained at the source gives an indication of demand, which is of considerable value as a secondary factor in the automatic control of remote pressure.

As will be apparent from the following description the time lag on increasing pressure at the source is radically different from the time lag on decreasing pressure at the source,—the values of such time lags changing in opposite directions respectively as a function of demand. As aforestated, excess pressure is more or less of a function of demand depending upon load distribution about the system.

Also it is desirable that the adjustment of pressure at the source should be so co-ordinated with the time lag as to prevent objectionable "hunting" or over-adjustment of the control elements. Moreover, the rate of adjustment of pressure at the source should vary inversely as the time lag in order to limit "hunting" to a predetermined degree independently of variations in time lag. A rapid rate of adjustment of pressure at the source is desirable in order to compensate for unavoidable rapid rates of variation in pressure at the remote point. Since the time lag in a given installation may vary as much as five times a given value (depending upon whether the pressure at the source is increased or decreased, and depending upon whether the demand for the fluid is great or small), it is likewise desirable to provide several rates of adjustment of pressure at the source.

Ordinarily, because of practical limitations, the percentage of flow from the receiver does not exceed fifty per cent of the maximum flow into the receiver, wherefore the time lag incident to an increase in pressure at the source is always shorter than the time lag incident to a decrease in pressure at the source.

Moreover, the rate of adjustment of pressure at the remote point should be co-ordinated with the time lag. An increase or decrease in pressure at the source becomes less effective for producing the desired change in pressure at the remote point as the demand for the fluid increases. A predetermined constant percentage increase in the amount of excess pressure at the source is an approximation of the amount of pressure increase necessary to provide a constant increase in pressure at the remote point. Therefore, for any given time lag a constant percentage increase in rate of change in excess pressure should be provided. The methods and apparatus herein disclosed are adapted to provide for attainment of the desirable results aforementioned.

In the drawings, Figure 1 illustrates schematically and diagrammatically a fluid distribution system embodying my invention.

Fig. 2 is a perspective view of a valve like that illustrated in Fig. 1, but showing a modified form of load-adjusting means therefor.

Fig. 3 illustrates schematically and diagrammatically a portion of a fluid distribution system adapted to perform the functions of the system illustrated in Fig. 1, but showing a modified form of valve and operating means therefor,—the means for controlling the valve-adjusting motor, and other of the electro-mechanical control elements, being omitted for clarity of illustration, and—

Fig. 4 illustrates graphically the relation between the time lag and several factors affecting the time lag under different conditions in a given installation.

Referring first to Fig. 1, the numeral 10 designates a conduit which, it may be assumed, represents a suitable source of fluid under pressure, as, for instance, combustible gas. The numeral 11 designates a distribution conduit, and between conduits 10 and 11 is a loaded pressure-responsive valve mechanism designated in general by the numeral 12. Associated with conduit 11 at a point remote from valve 12 is a device 13 having parts thereof operable in a direction and to a degree corresponding with variations in pressure of the fluid at said remote point with respect to a predetermined value.

Referring more particularly to the valve 12, the same is in general of well known form, and comprises a casing 12ª interposed between conduits 10 and 11, and twin valve elements 12ᵇ, 12ᶜ carried by rod 12ᵈ whose upper end is engaged by the diaphragm 12ᵉ. Diaphragm 12ᵉ is subjected through a small pipe 12ᶠ to the pressure of fluid at the outlet side of the valve, whereby the latter is automatically biased toward closed position when said pressure exceeds a predetermined value. Such value is predetermined by the loading means represented by the lever 12ᵍ pivotally supported at 12ʰ and pivotally attached at 12ⁱ to rod 12ᵈ, said lever carrying a weight 12ʲ provided with rollers 12ᵏ to facilitate movement thereof along the lever. Weight 12ʲ is provided with auxiliary elements 12ᵐ to provide for manual adjustment of its loading value,—it being noted that said weight is so arranged as to bias valve 12 toward open position.

Assuming proper calibration of the valve parts and a given adjustment of weight 12ʲ, 12ᵐ, it will be apparent that a given pressure of fluid will be maintained at the outlet side of valve 12. Also any variation in pressure at the remote end of conduit 11 would be gradually transmitted through said conduit 11 to diaphragm 12ᵉ to effect a corresponding change in the degree of opening of valve 12. However, where said remote end is five or ten miles distant from valve 12 the time lag in effecting the required adjustment of said valve would be so great as to result in very wide fluctuations in pressure at the remote end under conditions of variation in demand for the fluid. Accordingly I have provided means for substantially instantaneously varying the degree of loading of valve 12 to compensate for variations in pressure at the remote point,—said means as shown in Fig. 1 including a lever 14 pivotally engaged at one end with weight 12ʲ and pivotally engaged at its other end with a lever or crank arm 15 which is oscillatably supported by bracket 16 on lever 12ᵍ. Arm 15 is adapted to be driven in reverse directions selectively, as by means of a flexible connection 17 between the same and a pinion 18,—the latter having a shaft 19 keyed or otherwise fixed thereto for a purpose to be described hereinafter.

Pinion 18 is adapted to be driven by a worm gear 20 mounted upon the armature shaft 21 of a motor designated by the reference character M. Motor M is of the well known split-field reversible type, the alternative fields thereof being shown at *f* and *f¹*. The armature shaft of motor M is also provided with a threaded extension 22 for cooperation with a traveling nut 23 which in one extreme position is adapted to effect opening of switches 24 and 25 and which in the other extreme position thereof is adapted to effect opening of switches 26 and 27. Switches 24 and 26 act when opened to limit the degree of operation of motor M in opposite directions respectively. The switch 25 when opened effects deenergization of the operating winding of a relay 28 whereupon the contacts 28ª of the latter are closed to complete an energizing circuit from battery 29 through an electric bell-ringer 30 or other audible signaling device. In a like manner the switch 27 when opened effects deenergization of the operating winding of a relay 31 whose contacts 31ª then close to complete the circuit for said electric bell 30.

It is to be understood that the levers 14, 15 are so arranged and proportioned that a given period of operation of motor M will vary the value of the excess pressure at the outlet end of valve 12 to a degree depending upon the instantaneous value of such excess pressure. Moreover the arrangement of said levers is such as to compensate for variations in time lag incident to increases in pressure at the source corresponding with variations in demand for the fluid (which is reflected in the necessary amount of excess pressure). However, instead of increasing the degree of excess pressure to provide a constant percentage increase in such pressure, I prefer to provide for a decrease in the percentage increase in pressure as the excess pressure increases whereby I am enabled to compensate for the increased time lag incident to an increase in pressure at the source. The device illustrated in Fig.

1 is adapted to function in this manner; and as will be explained more fully hereinafter, the maximum rate of excess pressure adjustment incident to a required increase in pressure at the source is controlled by the interrupter $IT^2$ whose contacts may be maintained closed for the desired portion of a cycle of operation of the adjustable cam members 32 and 33. A timing device of this general character is disclosed in my copending application Serial No. 540,863, filed May 29, 1931.

For reasons aforestated the compensation just described does not even approximate the compensation required for variations in time lag incident to a decrease in pressure at the source. The maximum rate of excess pressure adjustment incident to a required decrease in pressure at the source is controlled by the interrupter $IT^1$ whose contacts will be maintained closed for the desired portion of a cycle of operation of the adjustable cam members 34 and 35. At low loads the time lag upon a decrease in pressure at the source is longer and under these conditions it is desired to slow up the rate of adjustment to compensate for such longer time lag, and also to differentiate from the compensation for time lag variation upon an increase in pressure at the source (which latter compensation is opposite in direction and has been included in the lever mechanism 14, 15). Accordingly I have provided a variable resistance 36 which is connected in circuit in series with field $f^1$,—a short-circuiting contactor $36^a$ being rotatable with shaft 19 whereby its position depends upon the degree of loading of valve 12. Thus upon movement of weight $12^j$, $12^m$ toward the left to full loading position, contactor $36^a$ will be moved toward the right to include all of resistance 36 in series with field $f^1$ to insure a relatively slower rate of unloading of valve 12.

In certain installations the compensation provided by resistance 36, upon decreasing the pressure at the source, is not necessary and may be eliminated,—assuming that the rate of adjustment afforded by the setting of cam members 34 and 35 is sufficiently slow so that no excessive hunting will result. On decreasing pressure the latter arrangement is not objectionable as the functioning of the control system is affected only to the extent of limiting the rate at which the pressure at the source may be decreased. This may result in a temporary excess pressure at the distant point,—which, however, is not nearly so dangerous or objectionable as a temporary deficiency of pressure at said point.

I have also provided means affording an increased rate of pressure adjustment in response to a relatively wide degree of divergence of pressure from a preselected value at the distant point. Such increased rate of adjustment is provided by shorting out the interrupter $IT^3$, which as shown may be driven at one-half the speed of the interrupters $IT^1$, $IT^2$ aforementioned. Thus the interrupter $IT^3$ when effective is adapted to render the interrupters $IT^1$ and $IT^2$ ineffective for completing circuit for approximately one out of each two cycles of operation thereof,—the cam members 37, 38 being adjustable to vary the relative length of the periods during which the contacts of interrupter $IT^3$ are opened or closed. The means for shorting out interrupter $IT^3$ comprises a relay $CR^3$ having an operating winding 39 and normally open contacts 40, 41 and 42,—the energizing circuit of winding 39 being adapted to be completed upon movement of the contactor 43 of a polarized relay $PR^3$ from neutral position into engagement with either of the contacts 44 or 45. The operating winding of relay $PR^2$ is shown at 46.

Interrupter $IT^1$ is adapted to be rendered effective for controlling the circuit of motor M through field $f^1$ to reduce the degree of loading of valve 12 upon closure of the normally open contacts 47 of a relay $CR^1$, the operating winding of which is shown at 48,—said relay having normally open contacts 49 adapted to control the energizing circuit of a signal lamp 50, which is preferably colored green. The energizing circuit of winding 48 will be completed upon engagement of the contactor 51 of polarized relay $PR^1$ with the left hand contact 52,—the operating coil of relay $PR^1$ being shown at 53.

Interrupter $IT^2$ is adapted to be rendered effective for controlling the circuit of motor M through field $f$ to increase the degree of loading of valve 12 upon closure (as shown) of the normally open contacts 54 of a relay $CR^2$, the operating winding of which is shown at 55,—said relay having normally open contacts 56 adapted to control the energizing circuit of a signal lamp 57, which is preferably colored red. As shown, the energizing circuit of winding 55 is completed by engagement of contactor 51 of relay $PR^1$ with the right hand contact 58.

The means for controlling energization of the windings 53 and 46 of polarized relays $PR^1$ and $PR^2$, respectively, is essentially like that described and claimed in the patent of Clarence S. Pinkerton, No. 1,931,771, dated October 24, 1933. Thus it is to be understood that the polarized relays $PR^1$, $PR^2$ are preferably located adjacent to the valve 12, whereas the operating windings 53, 46 of said relays are connected, as by means of a single pair of conductors 59, 60, with the device 13 located at the remote point, whereby the direction of flow of current through said windings is controlled.

More particularly, I have shown a transformer T having a primary winding 61 which, it may be assumed, is connected with a suitable source of alternating current of relatively high voltage, say 110 volts, as represented by lines $l^1$, $l^2$. If the lines $L^1$, $L^2$ represent a source of alternating current, then the primary 61 of the transformer might be connected thereacross. The aforementioned relatively high voltage is stepped down through the medium of the secondary windings 62, 63 of the transformer to a relatively low value, say 10 volts. The cost of providing the control lines 59, 60 is thus rendered very small,—whereas in practice such lines 59, 60 may represent wires which may be rented from a telephone company at a very low rate.

Associated with the secondary windings 62, 63 are the rectifier elements 64, 65 of well known form,—the direction of current flow through said rectifier elements being obvious. The windings 53 and 46 of the polarized relays are connected in parallel relationship to each other across conductors 59, 60,—the conductor 59 being connected to a common point 66 between the rectifier elements, and the conductor 60 being connected with the movable contactor 67 forming a part of the pressure responsive device 13. Contactor 67 is provided with a flexible extension $67^a$, whereby upon clockwise movement thereof, as a result of a decrease in pressure at the distant point with respect to the value preselected by adjustment of weight $67^b$, the contact 68 is first engaged to complete a circuit, through the resistance 69, for the windings 53 and 46 of the polarized relays.

This results in operation of relay PR¹ to the position illustrated wherein contactor 51 engages contact 58 to complete the energizing circuit of relay CR². The polarized relay PR² is so calibrated as to remain insensitive to the relatively small value of current flowing through the circuit including resistance 69, and the contactor 43 of said relay will remain in neutral position.

If the value of pressure at the remote point decreases still further the contactor 67 will be brought into engagement with contact 70, thereby short-circuiting resistance 69 to increase the value of current flowing through the polarized relay windings, while maintaining such flow in the direction aforementioned. Relay PR² will respond to the increased current to effect engagement of contactor 43 with contact 44, with consequent energization of relay CR³, whose contacts when closed are adapted to short circuit the interrupter IT³ for the purpose aforedescribed.

In like manner upon an increase in pressure above the value preselected by the adjustment of weight 67ᵇ of device 13 the contactor 67 will move from neutral position thereof in a counter-clockwise direction to first effect engagement of the flexible end thereof with contact 71. This completes a circuit, inclusive of resistance 72, to effect a flow of current in the opposite direction through the windings of the polarized relays. Relay PR¹ acts under these conditions to effect engagement of its contactor 51 with contact 52, thus completing an energizing circuit for the winding 48 of relay CR¹, whose contacts 47 close to render interrupter IT¹ effective to make and break circuit through field f¹ of motor M, with consequent movement of weight 12ʲ, 12ᵐ toward the right to gradually decrease the load upon valve 12. If the degree of pressure increase at the distant point is of still greater value contactor 67 will move counter-clockwise to engage contact 73. This short circuits resistance 72 and results in movement of contactor 43 of polarized relay PR² into engagement with contact 45. Winding 39 of relay CR³ is thus energized to short circuit interrupter IT³, with a consequent increase in the rate of unloading of valve 12.

I prefer to provide a push button switch of the character shown at 73ᶜ,—said switch being adapted upon closure of its contacts 73ᵃ, as shown, to provide for automatic control of the character aforedescribed, and said switch upon alternative closure of its contacts 73ᵇ being adapted to transfer control of the direction of operation of motor M to a pair of manually operated push button switches 74 and 75. Switches 74 and 75 may be interlocked in any well known manner to insure against simultaneous closure thereof.

I will now describe the various phases of automatic operation of the remote pressure controlling system illustrated in Fig. 1. Thus assuming a given adjustment of the weight 67ᵇ on device 13 and a given degree of loading of valve 12 to provide the desired degree of pressure at the remote point under conditions of a given demand for the fluid, it is to be understood that the contactor 67 of device 13 will remain in neutral or balanced position pending an increase or decrease in the demand. The operative position of the device 13 in Fig. 1 indicates that the demand for the fluid has been slightly increased, with a consequent decrease in the pressure of fluid at the remote point,—it being assumed that the pressure of fluid at the source is normally maintained substantially constant. Contactor 67 will thus be moved clockwise to effect engagement of its resilient end portion 67ᵃ with contact 68. The circuit thus completed for the windings 53, 46 of polarized relays PR¹, PR² may be traced from the opposite terminals of secondary 62 through the right hand half of rectifier element 64, conductor 76 through resistance 69 to contact 68, resilient end 67ᵃ and contactor 67, conductor 60 to and through windings 53 and 46 from bottom to top in parallel relationship to each other, conductor 59 to the common point 66, and thence through the left hand portion of rectifier element 64. As aforestated relay PR² is calibrated to remain unresponsive due to inclusion of resistance 69 in said circuit.

However, relay PR¹ responds and effects engagement of its contactor 51 with contact 58,—the resulting energizing circuit for relay CR² extending from line L¹ by conductor 77 through contactor 51, contact 58, conductor 78 through winding 55 of said relay to line L². Contacts 54 of relay CR² are thus closed to render interrupters IT² and IT³ jointly effective for controlling completion and interruption of circuit through the field f of motor M. Said circuit may be traced from line L¹ by conductor 79 through contacts 73ᵃ of switch 73ᶜ, conductors 80 and 81 through the contacts of interrupter IT³ during intermittent closure of the latter, conductors 82 and 83 through said contacts 54, conductor 84 through the contacts of interrupter IT² during intermittent closure of the latter, conductor 85 through the contacts of limit switch 24, field f and conductor 86 through the armature of motor M, and by conductor 87 to line L².

Interrupters IT² and IT³ are continuously operated at relatively different speeds, as by means of electric motor 88 which may be connected with lines L¹, L² in the manner illustrated. The cam members 32, 33 and 37, 38 associated with said interrupters are cooperatively arranged in accordance with the distance between valve 12 and the remote point at which device 13 is located, so that after a given operation of motor M to vary the degree of loading of valve 12 said motor will remain inactive for a period sufficiently long to provide for attainment at said remote point of the pressure effect of said valve adjustment before the operation of said motor is repeated. This feature, in general, is disclosed in the aforementioned Pinkerton Patent No. 1,743,233. If the aforedescribed increase in the degree of loading of valve 12 does not restore the pressure preselected for the remote point, the aforedescribed energizing circuit for relay PR¹ will be maintained by continued engagement of portion 67ᵃ of contactor 67 with contact 68, and thereafter motor M will be again operated for a predetermined period of time to further increase the degree of loading of valve 12.

So long as relay CR² remains closed the contacts 56 thereof will provide an energizing circuit for signal lamp 57, to indicate progress of the automatic adjustment for effecting the desired increase in pressure at the remote point. Said energizing circuit may be traced from line L¹ by conductor 89 through a suitable resistance 90, conductors 91, 92 through contacts 56, and by conductor 93 through said lamp 57 to line L². Due to inclusion of resistance 90 in circuit therewith the lamp 57 will have less than full brilliancy,—thus indicating that the divergence from the preselected pressure value at the remote point is relatively small.

If the decrease in pressure at the remote point is such as to cause contactor 67 to engage contact 70, the resistance 69 will be short-circuited (the current then flowing from conductor 76 through conductor 94 to contact 70 and contactor 67) and the increased value of current flowing in the energizing circuit of windings 53 and 46 of relays PR¹ and PR² will cause response of the latter in such a manner that its contactor 43 will engage contact 44. This completes a circuit which may be traced from line L¹ by conductor 95 through contactor 43 and contact 44, conductor 96 through the winding 39 of relay CR³ and thence to line L². Upon closure of contacts 40 of relay CR³ the interrupter IT³ is short-circuited, thus rendering the interrupter IT² solely effective for controlling the periodicity and duration of operation of motor M, whereby the rate of increase in loading of valve 12 is accelerated. By thus rapidly loading the valve 12 the fluid pressure is rapidly increased to the preselected value at the remote point.

Also upon closure of the contacts 41 of relay CR³ the same act, in conjunction with conductors 97 and 98, to short-circuit resistance 90. This will increase the degree of brilliancy of illumination of lamp 57, thus indicating the relatively wide divergence of pressure at the remote point. Contacts 42 of relay CR³ are likewise closed to complete an energizing circuit from battery 29 through the bell-ringer 30 or other audible signaling device, said energizing circuit being obvious. Said circuit preferably includes a manually operated switch 99 the contactor of which may be moved to the point 99ᵃ by the attendant to temporarily interrupt the signaling operation. Said contactor is also preferably movable to the point 99ᵇ to provide for testing the signaling device 30 and its associated battery 29 when desired.

When valve 12 has been adjusted to provide for full loading thereof (regardless of whether or not the relay CR³ has been energized), the traveling nut 23 will effect opening of limit switch 24 to interrupt the circuit through field f of motor M, thus stopping the latter. Nut 23 will also effect opening of switch 25 thus interrupting the energizing circuit of the winding of relay 28 (which circuit is obvious) and the contacts 28ᵃ of said relay will close to complete an alternative energizing circuit for the audible signaling device 30.

Also it is to be understood that as an incident to full loading of valve 12 the contactor 36ᵃ will have been moved to the extreme right hand end of resistance 36 to preset the circuit of motor M through its field f¹ for a relatively slower speed of the motor upon subsequent initiation of operation thereof to effect unloading of valve 12.

Now if it be assumed that the pressure at the remote point has slightly exceeded the preselected value, the contactor 67 will move from an intermediate or neutral position in a counterclockwise direction to effect engagement of the resilient end 67ᵃ with contact 71. This will complete an energizing circuit for the windings 53 and 46 of the polarized relays, which circuit may be traced from the opposite ends of secondary windings 63 through the right hand portion of rectifier element 65 to the aforementioned common point 66, thence by conductor 59 through said windings 53 and 46 from top to bottom in parallel relationship to each other, by conductor 60 through contactor 67 and end portion 67ᵃ to contact 71, by conductor 100 through resistance 72, and thence through the left hand portion of rectifier element 65.

Due to inclusion of resistance 72 in said circuit the relay PR² will not respond, but relay PR¹ will respond to effect engagement of its contactor 51 with contact 52, thus completing a circuit which may be traced from line L¹ by conductor 77 through contactor 51 and contact 52, conductor 101 through the winding 48 of relay CR¹ and thence to line L². Contacts 47 of relay CR¹ are thus closed to render the interrupters IT¹ and IT³ jointly effective for completing and interrupting a circuit for motor M through its field f¹. Said circuit may be traced from line L¹ by conductor 79 through contacts 73ᵃ of switch 73, conductors 80 and 81 through the contacts of interrupter IT³ when closed intermittently, conductors 82, 83 and 102 through contacts 47 of relay CR¹, thence through the contacts of interrupter IT¹ when closed intermittently, conductor 103 through contactor 36ᵃ and through that portion of resistance 36 at the left hand side of said contactor (it having been assumed that contactor 36ᵃ is then in its extreme right hand position), by conductor 104 through the contacts of limit switch 26, and through field f¹ and the armature of motor M by conductor 87 to line L².

Motor M will thereupon operate in the reverse direction to effect gradual unloading of valve 12,—such unloading operation being effected more slowly than the previously described loading operation, due to inclusion of all or a portion of the resistance 36 in the motor circuit. The interrupters IT¹ and IT³ function in the manner aforementioned to permit attainment at the distant point of the pressure effect of a given degree of unloading of valve 12 prior to a repeated operation of the motor.

The contacts 49 of relay CR¹ when closed complete a circuit which may be traced from line L¹ by conductor 89 through resistance 90, conductors 91 and 105 through said contacts 49 and lamp 50 to line L² to provide for illumination of said lamp at less than full brilliancy.

In the event of a substantially greater excess of pressure at the remote point contactor 67 of device 13 will be caused to engage contact 73, thus acting through conductor 106 to short-circuit resistance 72. Polarized relay PR² will thereupon respond to effect engagement of its contactor 43 with contact 45, thus completing an alternative energizing circuit for the winding 39 of relay CR³, said circuit being obvious from the previous description. Contacts 40 of relay CR³ thereupon close in the manner aforedescribed to short-circuit interrupter IT³ whereby the rate of unloading of valve 12 will be increased. Closure of contacts 41 of relay CR³ results in short-circuiting of resistance 90 with a consequent increase in the intensity of illumination of lamp 50 to indicate progress of the adjustment necessary to compensate for the relatively high degree of divergence of pressure at the remote point. Contacts 42 also act in the manner aforedescribed to complete an energizing circuit for the bell 30.

In any event the unloading of valve 12 is continued automatically pending attainment of the preselected pressure condition at the remote point, or until valve 12 is fully unloaded. If it is necessary to fully unload valve 12 the nut 23 will act to open the contacts of limit switch 26 to interrupt the operation of motor M in the unloading direction; and said nut will at the same time effect opening of the contacts of switch 27, whereby the energizing circuit of relay 31 is interrupted and the contacts 31ᵃ thereof closed to complete an alternative energizing circuit for bell 30,—said circuit being obvious.

The means for controlling energization and de-energization of lamps 57 and 50 might be modified, if desired, by eliminating the resistance 90, the conductors 89 and 97, and the contacts 42 on relay CR³; and then merely electrically connecting the conductor 98 with the conductor 82 in the manner indicated in dotted lines at 107 in Fig. 1. With this modified arrangement the lamp 57 or the lamp 50 would be fully illuminated upon closure of relay CR¹ or CR², respectively; such illumination being intermittent (through the contacts of interrupter IT³) so long as relay CR³ remains de-energized, and continuous upon closure of the contacts 40 of relay CR³ to short-circuit the interrupter IT³. Intermittent illumination of either of the lamps would therefore indicate progress of adjustment to compensate for relatively small variations in pressure at the remote point, and continuous illumination of either of the same would indicate progress of adjustment to compensate for relatively large variations in such pressure with respect to the preselected value.

In Fig. 2 I have shown the pressure regulating valve 12 as having parts corresponding with those shown in Fig. 1, but wherein the motor M¹ is supported directly upon the lever 12$^g$,—the motor being connected (through suitable reduction gearing, not shown) with a pair of shafts 108 and 109. Keyed or otherwise rigidly secured to shaft 108 is a curved lever 15$^x$, and pivotally connected to the latter and to weight 12$^j$ is a lever 14$^x$. A reversely curved lever 15$^y$ is keyed to shaft 109 and pivotally connected to lever 15$^y$ and to weight 12$^j$ is a lever 14$^y$. Shafts 108 and 109 are arranged for rotation simultaneously in reverse directions with respect to each other throughout an arc or angle of approximately one hundred and ten degrees.

Referring more particularly to Fig. 4 wherein A designates the curve showing the variations in time lag upon an increase in pressure at the source as an incident to variations in the rate of flow of or demand for the fluid at the remote point,—the time lag under these conditions being greatest when the demand for fluid at the remote point is highest. Conversely, as shown by curve B, upon a decrease in pressure at the source the time lag is greatest when the demand for fluid at the remote point is lowest. In the graphic illustration of Fig. 4 the factor gives the time lag in minutes for a receiver (or distribution conduit) whose capacity, in cubic feet, is equivalent to ten times the maximum flow into the receiver (cubic feet per hour "as is") in order to change the absolute pressure one-fourth of one percent. Thus:

If I equals the percentage increase in absolute pressure, and—F equals the maximum flow (in percentage of the receiver capacity); then—time lag equals (factor)

$$\left(\frac{I}{.25}\right)\left(\frac{1}{F}\right)$$

in minutes. The velocity of the pressure wave is approximately 1300 feet per second, and the time lag for average distribution is therefore probably not affected to an appreciable extent, except on very long pipe lines, say, five to ten miles in length. The load distribution in a given system is probably of minor importance, so far as time lag is concerned.

The device illustrated in Fig. 3 is functionally similar to that shown in Fig. 1,—and it is to be understood that the complete system of Fig. 3 would include the pressure responsive device 13 (Fig. 1) located at a remote point and all of the other aforedescribed elements required for proper control of operation of motor M² in reverse directions respectively,—said parts being omitted from Fig. 3 for clarity of illustration. Thus I have shown a distribution conduit 110 in which the fluid is adapted to flow in the direction indicated by the arrow. Located within conduit 110 is a disk- or butterfly-valve 111 having a bearing shaft 112 to which is rigidly secured a crank 113. Crank 113 is pivotally engaged by one end of a lever 114 the other end of the latter being pivotally engaged by a shaft 115 attached to a piston 116 which is slidable within a cylinder 117. Communicating with cylinder 117 at opposite ends of the latter are a pair of pipes 118, 119 the open upper ends of which are arranged closely adjacent to each other within a chamber 120. Pivotally mounted within chamber 120 is a nozzle 121 which is adapted to be supplied with air or other fluid under pressure from the compressor or pump 122 which as shown is driven by an electric motor 123. The inlet end of pump 122 may be connected, as by means of pipe 124, with chamber 120 to remove any excess fluid from the latter. When the nozzle is in its intermediate or neutral position, as shown, the pressures within pipes 118, 119 and at opposite ends of cylinder 117 will be equalized, and consequently the piston 116 and valve 111 controlled thereby will remain in any given position of adjustment.

Attached to the right hand side of nozzle 121 is a rod 125 which is also attached to a diaphragm 126 located within the casing 127. Casing 127 communicates through pipe 128 with conduit 110 at the right hand side of valve 111 whereby said diaphragm 126 is subjected to pressure conditions on the downstream side of valve 111. Also attached to the left hand side of nozzle 121 is a rod 129, a coiled compression spring 130 being interposed between the outer end of said rod and an abutment 131. In practice the abutment is so positioned initially as to insure operation of valve 111 toward open or closed position pending attainment of a preselected degree of pressure on the downstream side of valve 111, as measured by diaphragm 126. The device thus far described is in general similar to the device illustrated in the Wünsch Patent No. 1,558,529, dated October 27, 1925.

However, in the device of Fig. 3 I have shown means for automatically adjusting the position of abutment 131 to provide for performance of the functions described in connection with the device of Fig. 1. Said means may comprise a rod 132 attached at one end to abutment 131,—said rod being slidable within bearings 133, 134, and having a lever 14, like that illustrated in Fig. 1, pivotally connected to its other end. Lever 14 is pivotally connected with an oscillatable lever 15 which is rotatable with the shaft or flexible connection 17 attached to pinion 18, which is driven in one direction or the other by worm 20 carried by the armature shaft of motor M². Assuming control of operation of motor M² by means exactly corresponding with that described in connection with motor M of Fig. 1 it is obvious that the degree of compression of spring 130 will be varied automatically to rapidly and accurately compensate for variations in pressure at the remote point in the distribution system whereby such pressure will be maintained substantially constant under all conditions of variations in demand for the fluid.

The necessity for pump or compressor 122 may be eliminated by connecting nozzle 121 through a pipe, shown in dotted lines at 135, with conduit 110 at the upstream side of valve 111, and by providing an exhaust pipe, shown in dotted lines at 136, extending between chamber 120 and conduit 110 at the downstream side of valve 111.

What I claim as new and desire to secure by Letters Patent is:

1. In a fluid distribution system, in combination, a source of fluid under pressure, a conduit through which said fluid is adapted to flow, an adjustably loaded valve located in said conduit adjacent to said source, means responsive to the pressure of fluid on the downstream side of said valve at a point adjacent to the latter to automatically effect adjustment thereof whereby said pressure is normally maintained substantially constant, means for ascertaining the variations in pressure of said fluid, at a point remote from said valve, with respect to a predetermined value, and power-operated loading means for said valve subject to control by said last mentioned means for gradually adjusting the loading of said valve at different rates respectively upon an increase or decrease in pressure at said remote point to accurately compensate for said pressure variations at the remote point, said last mentioned means including auxiliary means operable automatically in response to relatively wide variations in pressure at said remote point to effect an increase in the respective rates of adjustment of the loading of said valve, said power-operated means including means adapted to function in accordance with and to compensate for variations in the length of time required for an adjustment in the instantaneous pressure of fluid at said point adjacent to the valve to become effective at said remote point as an incident to variations in the rate of discharge of fluid from the system.

2. In a fluid distribution system, in combination, a source of fluid under pressure, a conduit through which said fluid is adapted to flow, an adjustably loaded valve located in said conduit adjacent to said source, means responsive to the pressure of fluid on the downstream side of said valve at a point adjacent to the latter to automatically effect adjustment thereof whereby said pressure is normally maintained substantially constant, means for ascertaining the variations in pressure of said fluid, at a point remote from said valve, with respect to a predetermined value, power-operated means subject to control by said last mentioned means for adjusting the loading of said valve to compensate for said pressure variations at the remote point, said power-operated adjusting means having parts thereof so arranged as to insure adjustment of the loading of said valve at a predetermined rate in response to an increase in pressure at the remote point above said predetermined value and to insure adjustment of the loading of said valve at a relatively slower rate in response to a decrease in pressure at the remote point below said predetermined value, and said power-operated means including means adapted to function in accordance with and to compensate for variations in the length of time required for an adjustment in the instantaneous pressure of fluid at said point adjacent to the valve to become effective at said remote point as an incident to variations in the rate of discharge of fluid from the system.

3. In a fluid distribution system, in combination, a source of fluid under pressure, a conduit through which said fluid is adapted to flow, an adjustably loaded valve located in said conduit adjacent to said source, means responsive to the pressure of fluid on the downstream side of said valve at a point adjacent to the latter to automatically effect adjustment thereof whereby said pressure is normally maintained substantially constant, means for ascertaining the variations in pressure of said fluid, at a point remote from said valve, with respect to a predetermined value, power-operated means subject to control by said last mentioned means for automatically varying the degree of loading of said valve to compensate for said pressure variations at the remote point, said power-operated means having parts thereof so arranged as to insure adjustment of the loading of said valve at a predetermined rate in response to an increase in pressure at the remote point above said predetermined value, said parts being also operable to insure adjustment of the loading of said valve at a relatively slower rate in response to a decrease in pressure at the remote point below said predetermined value, said power-operated adjusting means also acting automatically to increase the respective rates of adjustment of the loading of said valve when the increase or decrease in pressure at said remote point is of a predetermined greater magnitude, and said power-operated adjusting means including means adapted to function in accordance with and to compensate for variations in the length of time required for an adjustment in the instantaneous pressure of fluid at said point adjacent to the valve to become effective at said remote point as an incident to variations in the rate of discharge of fluid from the system.

4. In a fluid distribution system, in combination, a source of fluid under pressure, a conduit through which said fluid is adapted to flow, an adjustably loaded valve located in said conduit adjacent to said source, means responsive to the pressure of fluid on the downstream side of said valve at a point adjacent to the latter to automatically effect adjustment thereof whereby said pressure is normally maintained substantially constant, means for ascertaining the variations in pressure of said fluid at a point remote from said valve, with respect to a predetermined value, and power-operated means subject to control by said last mentioned means for automatically varying the degree of loading of said valve to accurately and rapidly compensate for variations in pressure at said remote point as an incident to variations in demand for the fluid, said loading adjustment means including means for effecting opening movement of said valve at a relatively rapid rate in response to a predetermined decrease in pressure at said remote point and for effecting closing movement of said valve at a relatively slower rate in response to a predetermined increase in pressure at said remote point, whereby the different values of the time lags of the pressure effects transmitted to said remote point as an incident to opening or closing movements respectively of said valve are neutralized, and whereby said power-operated means is adapted to function in accordance with and to compensate for variations in the length of time required for an adjustment in the instantaneous pressure of fluid at said point adjacent to the valve to become effective at said remote point as an incident to variations in the rate of discharge of fluid from the system.

5. In a fluid distribution system, in combination, a source of fluid under pressure, a conduit through which said fluid is adapted to flow, a valve located in said conduit adjacent to said source, means for regulating said valve in accordance with variations in pressure of the fluid on the downstream side of said valve at a point adjacent to the latter, said means including means for loading said valve whereby the pressure on the downstream side of said valve is normally maintained at a substantially constant predetermined value, power-operated means for varying the degree of loading of said valve in response to variations in pressure of fluid in said conduit at a point remote from said valve, whereby the pressure at said remote point is maintained substantially constant under conditions of variation in demand for the fluid, control means for said power-operated means including multiple switching means responsive to increases or decreases in pressure at said remote point with respect to a predetermined value, said control means also including means for insuring different rates of operation of said power-operated means upon said increases and decreases respectively in said pressure, and means for timing the response of said power-operated means to said multiple switching means whereby the pressure effect of a given adjustment of said loading means may be attained at the remote point prior to a repeated operation of said power-operated means, said timing means including means responsive to said multiple switching means to automatically increase the rate of operation of said loading means by said power-operated means upon a given increase or decrease in pressure at their remote point with respect to said predetermined value, whereby said power-operated means is adapted to function in accordance with and to compensate for variations in the length of time required for an adjustment in the instantaneous pressure of fluid at said point adjacent to the valve to become effective at said remote point as an incident to variations in the rate of discharge of fluid from the system.

6. In a fluid distribution system, in combination, a source of fluid under pressure, a conduit through which said fluid is adapted to flow, a valve located in said conduit adjacent to said source, means for regulating said valve in accordance with variations in pressure of the fluid on the downstream side of said valve at a point adjacent to the latter, said means including means for loading said valve whereby the pressure on the downstream side of said valve is normally maintained at a substantially constant value, power-operated means for varying the degree of loading of said valve in response to variations in pressure of fluid in said conduit at a point remote from said valve, whereby the pressure at said remote point is maintained substantially constant under conditions of variation in demand for the fluid, control means for said power-operated means including multiple switching means responsive to increases or decreases in pressure at said remote point with respect to a predetermined value, means for timing the response of said power-operated means to said multiple switching means whereby the pressure effect of a given adjustment of said loading means may be attained at the remote point prior to a repeated operation of said power-operated means, said timing means including means responsive to said multiple switching means to automatically increase the rate of operation of said loading means upon a given increase or decrease in pressure at the remote point with respect to said predetermined value, and means associated with said timing means to insure respectively relatively slower rates of adjustment of said loading means by said power-operated means during unloading of said valve than during loading of the latter, whereby said power-operated means is adapted to function in accordance with and to compensate for variations in the length of time required for an adjustment in the instantaneous pressure of fluid at said point adjacent to the valve to become effective at said remote point as an incident to variations in the rate of discharge of fluid from the system.

7. In a fluid distribution system, in combination, a source of fluid under pressure, a conduit through which said fluid is adapted to flow, a valve located in said conduit adjacent to said source, means for regulating said valve in accordance with variations in pressure of the fluid on the downstream side of said valve at a point adjacent to the latter, said means including means for loading said valve whereby the pressure on the downstream side of said valve is normally maintained at a substantially constant value, power-operated means for varying the degree of loading of said valve in response to variations in pressure of fluid in said conduit at a point remote from said valve, whereby the pressure at said remote point is maintained substantially constant under conditions of variation in demand for the fluid, control means for said power-operated means including multiple switching means responsive to increases or decreases in pressure at said remote point with respect to a predetermined value, and means for timing the response of said power-operated means to said multiple switching means whereby the pressure effect of a given adjustment of said loading means may be attained at the remote point prior to a repeated operation of said power-operated means, said timing means including means responsive to said multiple switching means to automatically increase the rate of operation of said loading means upon a given increase or decrease in pressure at the remote point with respect to said predetermined value, for the purpose set forth, the aforementioned means including means providing for loading and unloading of said valve by said power-operated means at relatively different rates respectively to compensate for differences in values of the time lags respectively incidental to increases and decreases in pressure of fluid controlled by said valve, whereby said power-operated means is adapted to function in accordance with and to compensate for variations in the length of time required for an adjustment in the instantaneous pressure of fluid at said point adjacent to the valve to become effective at said remote point as an incident to variations in the rate of discharge of fluid from the system.

8. In a device of the character described, in combination, a pair of polarized relays each having an operating winding, means comprising a single conductor for connecting one terminal of each of said windings to a common source of energy supply, a switch having a movable contactor and a plurality of pairs of stationary contacts, a second conductor electrically connecting the other terminals of said windings with said contactor, said contactor being adapted to sequentially engage the stationary contacts of each pair, said pairs of contacts when so engaged being adapted to provide flows of current from said source through said windings jointly in reverse directions respectively, means associated with the first contact of each pair to insure a reduced flow of current through said windings, one of said relays being calibrated to remain unresponsive to said reduced flow of current, and means associated with the second contact of each pair and adapted upon engagement thereof by said contactor to effect short-circuiting of said current flow reducing means whereby both of said relays are rendered responsive.

9. In a device of the character described, in combination, a pair of polarized relays each having an operating winding, means comprising a single conductor for connecting one terminal of each of said windings to a common source of energy supply, a switch having a movable contactor and a plurality of pairs of stationary contacts, a second conductor electrically connecting the other terminals of said windings with said contactor, said contactor being adapted to sequentially engage the stationary contacts of each pair, said pairs of contacts when so engaged being adapted to provide flows of current from said source through said windings jointly in reverse directions respectively, means associated with the first contact of each pair to insure a reduced flow of current through said windings, one of said relays being calibrated to remain unresponsive to said reduced flow of current, means associated with the second contact of each pair and adapted upon engagement thereof by said contactor to effect short-circuiting of said current flow reducing means whereby both of said relays are rendered responsive, a pair of electromagnetically operable switches controllable selectively by one of said relays according to the direction of current flow through the latter, and a third electromagnetically operable switch to be controlled by the other relay upon each operation of the latter regardless of the direction of current flow.

10. In a device of the character described, in combination, a pair of polarized relays each having an operating winding, means comprising a single conductor for connecting one terminal of each of said windings to a common source of energy supply, a switch having a movable contactor and a plurality of pairs of stationary contacts, a second conductor electrically connecting the other terminals of said windings with said contactor, said contactor being adapted to sequentially engage the stationary contacts of each pair, said pairs of contacts when so engaged being adapted to provide flows of current from said source through said windings jointly in reverse directions respectively, means associated with the first contact of each pair to insure a reduced flow of current through said windings, one of said relays being calibrated to remain unresponsive to said reduced flow of current, means associated with the second contact of each pair and adapted upon engagement thereof by said contactor to effect short-circuiting of said current flow reducing means whereby both of said relays are rendered responsive, a pair of electromagnetically operable switches controllable selectively by one of said relays according to the direction of current flow through the latter, a third electromagnetically operable switch to be controlled by the other relay upon each operation of the latter regardless of the direction of current flow, fluid pressure responsive means for controlling the operation of said contactor, and associated power-operated fluid pressure adjusting means controlled by said electromagnetically operable switches.

11. In a device of the character described, in combination, a pair of polarized relays each having an operating winding, means comprising a single conductor for connecting one terminal of each of said windings to a common source of energy supply, a switch having a movable contactor and a plurality of pairs of stationary contacts, a second conductor electrically connecting the other terminals of said windings with said contactor, said contactor being adapted to sequentially engage the stationary contacts of each pair, said pairs of contacts when so engaged being adapted to provide flows of current from said source through said windings jointly in reverse directions respectively, means associated with the first contact of each pair to insure a reduced flow of current through said windings, one of said relays being calibrated to remain unresponsive to said reduced flow of current, means associated with the second contact of each pair and adapted upon engagement thereof by said contactor to effect short-circuiting of said current flow reducing means whereby both of said relays are rendered responsive, a pair of electromagnetically operable switches controllable selectively by one of said relays according to the direction of current flow through the latter, a third electromagnetically operable switch to be controlled by the other relay upon each operation of the latter regardless of the direction of current flow, fluid pressure responsive means for controlling the operation of said contactor, associated power-operated fluid pressure adjusting means controlled by said electromagnetically operable switches and signaling means also controlled by the respective electromagnetically operable switches to indicate the character of operation of said power-operated means.

12. In a device of the character described, in combination, a pair of polarized relays each having an operating winding, means comprising a single conductor for connecting one terminal of each of said windings to a common source of energy supply, a switch having a movable contactor and a plurality of pairs of stationary contacts, a second conductor electrically connecting the other terminals of said windings with said contactor, said contactor being adapted to sequentially engage the stationary contacts of each pair, said pairs of contacts when so engaged being adapted to provide flows of current from said source through said windings jointly in reverse directions respectively, means associated with the first contact of each pair to insure a reduced flow of current through said windings, one of said relays being calibrated to remain unresponsive to said reduced flow of current, means associated with the second contact of each pair and adapted upon engagement thereof by said contactor to effect short-circuiting of said current flow reducing means whereby both of said relays are rendered responsive, a pair of electromagnetically operable switches controllable selectively by one of said relays according to the direction of current flow through the latter, a third electromagnetically operable switch to be controlled by the other relay upon each operation of the latter, regardless of the direction of current flow, fluid pressure responsive means for controlling the operation of said contactor, associated power-operated fluid pressure adjusting means controlled by said electromagnetically operable switches, said last mentioned means including a fluid pressure regulating valve having adjustable loading means to be controlled thereby, and signaling means also controlled by the respective electromagnetically operable switches to indicate the character of operation of said power-operated means.

13. In a device of the character described, in combination, a pair of polarized relays each having an operating winding, means comprising a single conductor for connecting one terminal of each of said windings to a common source of energy supply, a switch having a movable contactor and a plurality of pairs of stationary contacts, a second conductor electrically connecting the other terminals of said windings with said contactor, said contactor being adapted to sequentially engage the stationary contacts of each pair, said pairs of contacts when so engaged being adapted to provide flows of current from said source through said windings jointly in reverse directions respectively, means associated with the first contact of each pair to insure a reduced flow of current through said windings, one of said relays being calibrated to remain unresponsive to said reduced flow of current, means associated with the second contact of each pair and adapted upon engagement thereof by said contactor to effect short-circuiting of said current flow reducing means whereby both of said relays are rendered responsive, a pair of electromagnetically operable switches controllable selectively by one of said relays according to the direction of current flow through the latter, a third electromagnetically operable switch to be controlled by the other relay upon each operation of the latter regardless of the direction of current flow, fluid pressure responsive means for controlling the operation of said contactor, associated power-operated fluid pressure adjusting means controlled by said electromagnetically operable switches, said last mentioned means including a fluid pressure regulating valve having adjustable loading means to be controlled thereby, signaling means also controlled by the respective electromagnetically operable switches to indicate the character of operation of said power-operated means, and means including a single manually operable switch for transferring control of said power-operated means to a pair of manually operable control instrumentalities.

14. The method of maintaining a fluid pressure of substantially constant predetermined value at a remote point in a fluid distribution system under conditions of variation in demand for the fluid, which comprises effecting a flow of the fluid in a manner to provide a predetermined pressure thereof at a point adjacent to the source, ascertaining the instantaneous degree of divergence of the pressure at said remote point with respect to said predetermined value, increasing or decreasing the pressure of fluid at said point adjacent to the source at relatively different rates when the degree of divergence of pressure at said remote point is relatively small in either direction respectively, and increasing said relatively different rates of pressure increase or decrease when the degree of divergence of pressure at said remote point is relatively larger in either direction respectively.

15. The method of maintaining a substantially constant predetermined pressure at a remote point in a fluid distribution system under conditions of variation in demand for the fluid, which consists in normally maintaining a predetermined pressure of fluid at a point adjacent to the source, ascertaining the instantaneous value of pressure at said remote point, increasing, at a predetermined rate, the pressure at said point adjacent to said source to compensate for a decrease in pressure at said remote point, and decreasing, at a relatively slower rate, the pressure at said point adjacent to said source to compensate for an increase in pressure at said remote point.

16. The method of maintaining a substantially constant predetermined pressure at a remote point in a fluid distribution system under conditions of variation in demand for the fluid, which consists in normally maintaining a predetermined pressure of fluid at a point adjacent to the source, ascertaining the instantaneous value of pressure at said remote point, increasing, at a predetermined rate, the pressure at said point adjacent to said source to compensate for a decrease in pressure at said remote point, and decreasing, at a relatively slower rate, the pressure at said point adjacent to said source to compensate for an increase in pressure at said remote point, said different rates of increase and decrease in pressure at said point adjacent to said source being adapted to accurately compensate for variations in time lag of the pressure effects incident to increasing or decreasing the pressure at said point adjacent to said source under said conditions of variation in demand for the fluid.

17. In a method of compensating for differences in time lag as an incident to increases or decreases in the rate of flow of fluid to compensate for decreases or increases, respectively, of fluid pressure at a remote point in a fluid distribution system, the steps which consist in substantially instantaneously decreasing at a relatively slow rate the pressure of fluid at a point adjacent to the source to compensate for an increase in fluid pressure at the remote point, and substantially instantaneously increasing at a relatively more rapid rate the pressure of said fluid at said point adjacent to the source to compensate for a decrease in fluid pressure at the remote point, and further modifying the aforementioned rates of pressure adjustment as a function of the pressure maintained at said point adjacent to the source, to thereby compensate for further variations in time lag as an incident to variations in the rate of demand for the fluid.

18. In a method of compensating for differences in time lag as an incident to increases or decreases in the rate of flow of fluid to compensate for decreases or increases, respectively, of fluid pressure at a remote point in a fluid distribution system, the steps which consist in substantially instantaneously decreasing at a relatively slow rate the pressure of fluid at a point adjacent to the source to compensate for an increase in fluid pressure at the remote point, and substantially instantaneously increasing at a relatively more rapid rate the pressure of said fluid at said point adjacent to the source to compensate for a decrease in fluid pressure at the remote point, further modifying the aforementioned rates of pressure adjustment as a function of the pressure maintained at said point adjacent to the source, to thereby compensate for further variations in time lag as an incident to variations in the rate of demand for the fluid, and accelerating the rates of decrease or increase in the pressure of fluid at said point adjacent to the source to more rapidly compensate for relatively larger increases or decreases, respectively, in pressure of fluid at the remote point.

19. In a device of the character described, in combination, a pair of polarized relays each having an operating winding, means comprising a single conductor for connecting one terminal of each of said windings to a common source of energy supply, a switch having a contactor, said contactor having a neutral position and the same being movable from said neutral position in either direction throughout a predetermined range, a second conductor electrically connecting the other terminals of said windings with said contactor, a plurality of sets of stationary contacts, said sets being respectively arranged on opposite sides of said neutral position, said contactor being adapted to sequentially engage the stationary contacts of the respective sets, the contacts of said sets when so engaged being respectively adapted to provide flows of current from said source through said windings jointly in reverse directions, means including resistors associated with the first contacts of the respective sets and adapted upon engagement thereof by said contactor selectively to provide for a reduced flow of current through said windings, one of said relays being calibrated to remain unresponsive to said reduced flow of current, and means associated with another contact of each set and adapted upon engagement thereof by said contactor selectively to effect short-circuiting of the respective resistor whereby both of said relays are rendered responsive.

EDWIN X. SCHMIDT.